(12) United States Patent
Jones

(10) Patent No.: US 7,934,591 B2
(45) Date of Patent: May 3, 2011

(54) CHECK-IN SYSTEM

(75) Inventor: David Pierce Jones, Geneva (CH)

(73) Assignee: Squid, Inc., Geneva (CH)

( * ) Notice: Subject to any disclaimer, the term of this patent is extended or adjusted under 35 U.S.C. 154(b) by 0 days.

(21) Appl. No.: 12/089,267

(22) PCT Filed: Oct. 5, 2006

(86) PCT No.: PCT/GB2006/003707
§ 371 (c)(1),
(2), (4) Date: Dec. 1, 2008

(87) PCT Pub. No.: WO2007/042770
PCT Pub. Date: Apr. 19, 2007

(65) Prior Publication Data
US 2009/0314613 A1  Dec. 24, 2009

(30) Foreign Application Priority Data
Oct. 7, 2005  (GB) .................................. 0520490.4

(51) Int. Cl.
*B65G 47/46* (2006.01)

(52) U.S. Cl. ................. 198/369.2; 198/861.3; 198/358; 198/349

(58) Field of Classification Search ............. 198/861.3, 198/861.5, 321, 322, 847, 369.2, 358, 349
See application file for complete search history.

(56) References Cited

U.S. PATENT DOCUMENTS

| | | | | |
|---|---|---|---|---|
| 3,666,073 A | * | 5/1972 | Lings et al. | 198/412 |
| 3,704,773 A | * | 12/1972 | Lingg et al. | 198/410 |
| 3,789,957 A | | 2/1974 | Close | |
| 4,179,020 A | * | 12/1979 | Heusler et al. | 198/326 |
| 4,232,776 A | * | 11/1980 | Dean | 198/322 |
| 4,620,629 A | * | 11/1986 | Dean | 198/836.1 |
| 4,848,539 A | * | 7/1989 | Allwein | 198/804 |
| 4,921,128 A | * | 5/1990 | Guigan et al. | 198/550.12 |
| 6,279,721 B1 | * | 8/2001 | Lyngso et al. | 198/369.2 |
| 2002/0104736 A1 | * | 8/2002 | Peppel et al. | 198/369.2 |
| 2002/0175055 A1 | * | 11/2002 | Ryde | 198/847 |

FOREIGN PATENT DOCUMENTS

| | | |
|---|---|---|
| GB | 2205803 A | 12/1988 |
| GB | 2299316 A | 10/1996 |
| WO | WO 2004/050480 A1 | 6/2004 |
| WO | WO 2005/087590 A1 | 9/2005 |

OTHER PUBLICATIONS

PCT Patent Office, "International Search Report," PCT Patent Office, (Mar. 27, 2007).
PCT Patent Office, "Written Opinion of the International Searching Authority," PCT Patent Office.
United Kingdom Patent Office, "Combined Search and Examination Report," United Kingdom Patent Office, (Nov. 17, 2005).

* cited by examiner

*Primary Examiner* — James R Bidwell
(74) *Attorney, Agent, or Firm* — GableGotwals

(57) ABSTRACT

A check-in system for receiving and transporting luggage from a passenger comprising a conveyor for transporting luggage. The conveyor having a top surface on which luggage is received and which extends from a front end to a rear end, a floor being adjacent to the front end of the conveyor for supporting a passenger. The top surface of the front end of the conveyor is substantially flush with the floor such that luggage may be slid from the floor onto the conveyor.

8 Claims, 2 Drawing Sheets

US 7,934,591 B2

CHECK-IN SYSTEM

CROSS-REFERENCE TO PENDING APPLICATIONS

This application is based on PCT Patent Application No. GB2006/003707, filed on Oct. 5, 2006, which was based on United Kingdom Patent Application No. 0520490.4, filed Oct. 7, 2005.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

REFERENCE TO A SEQUENCE LISTING

Not Applicable

BACKGROUND IN THE INVENTION

The present invention relates to a check-in system in which luggage is loaded on to a conveyor belt. In particular it relates to a check-in system at an airport.

Known airport check-in systems with conveyor belts have the disadvantage that the conveyor belt is raised above ground level. A passenger has to lift their suitcase or bag upwardly in order to place the suitcase or bag on to the conveyor belt. This is particularly difficult for elderly people, or if the suitcase or bag is heavy.

BRIEF SUMMARY OF THE INVENTION

The present invention provides a check-in system for receiving a check-in system for receiving and transporting luggage from a passenger, comprising:
  a conveyor for transporting luggage, the conveyor having a top surface on which luggage is received and which extends from a front end to a rear end;
  a floor adjacent the front end of the conveyor for supporting a passenger;
    wherein the top surface of the front end of the conveyor is substantially flush with the floor, such that luggage may be slid from the floor onto the conveyor.

This has the advantage that a suitcase can be slid on to the conveyor without requiring lifting.

Preferred embodiments of the present invention will now be described by way of example only, with reference to the accompanying figures, in which:

BRIEF DESCRIPTION OF THE INVENTION

Figure 1:
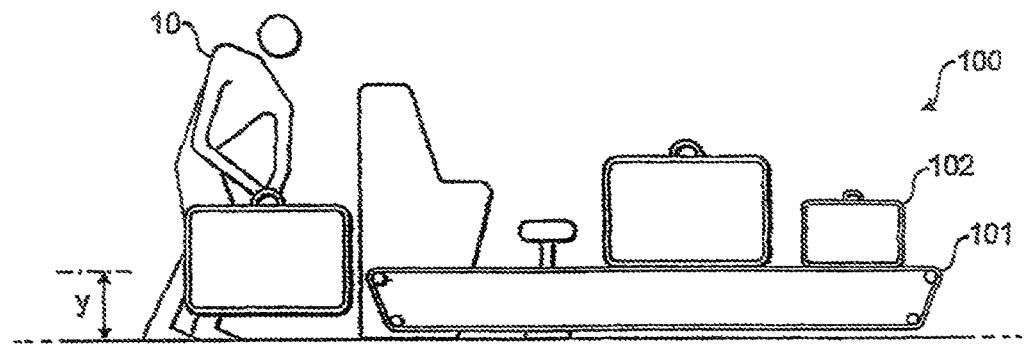
FIG. 1 is a side elevation view of a conventional airport check-in system.

With reference to FIG. 1, in order to check-in at an airport, a passenger 10 may stand adjacent to the conveyor belt 101, and speak to a member of staff. The passenger 10 may have to provide a ticket and a passport in order to check-in. Once the member of staff is satisfied the passenger 10 can travel on a flight from the airport, the suitcase 102 of the passenger 10 may need to be placed in the hold of the aircraft.

A conventional check-in system 100 at an airport includes a conveyor belt 101 for transporting suitcases 102. The suitcases 102 are transported from the check-in area to an aircraft by a series of conveyor belts and other systems. A passenger 10 is generally required to lift his or her own suitcase 102 on to the conveyor belt 101. The suitcase must be lifted vertically by a distance y, which may be particularly difficult if the suitcase is heavy.

Figure 2:
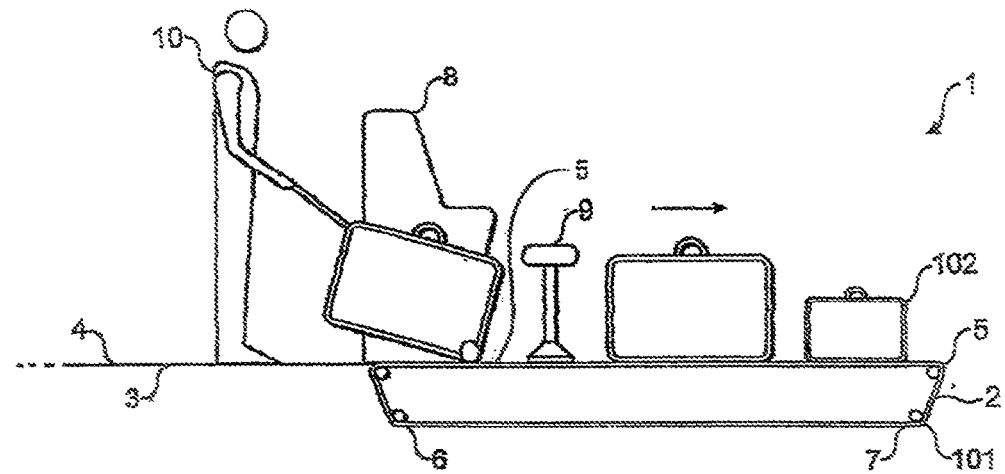
FIG. 2 is a side elevation view of the check-in system of the present invention.

With reference to FIG. 2, the check-in system 1 of the present invention comprises a conveyor belt 2. The conveyor belt 2 is of a known type, suitable for conveying articles such as suitcases 102. The check-in system also comprises a floor 3, on which a person 10 stands in order to use the conveyor belt.

The conveyor belt 2 is recessed in the floor 3 of the check-in system 1, such that a top surface 5 of the conveyor belt is level with the adjacent floor 3. The top surface 5 at a front end 6 and a rear end 7 of the conveyor belt 2 is on a level with the adjacent floor 3. Since the top surface 5 at the front end 6 of the conveyor belt 2 is flush with the adjacent floor 3, it is not necessary for a passenger 10 to lift the suitcase 102 on to the conveyor belt 2.

Figure 4:
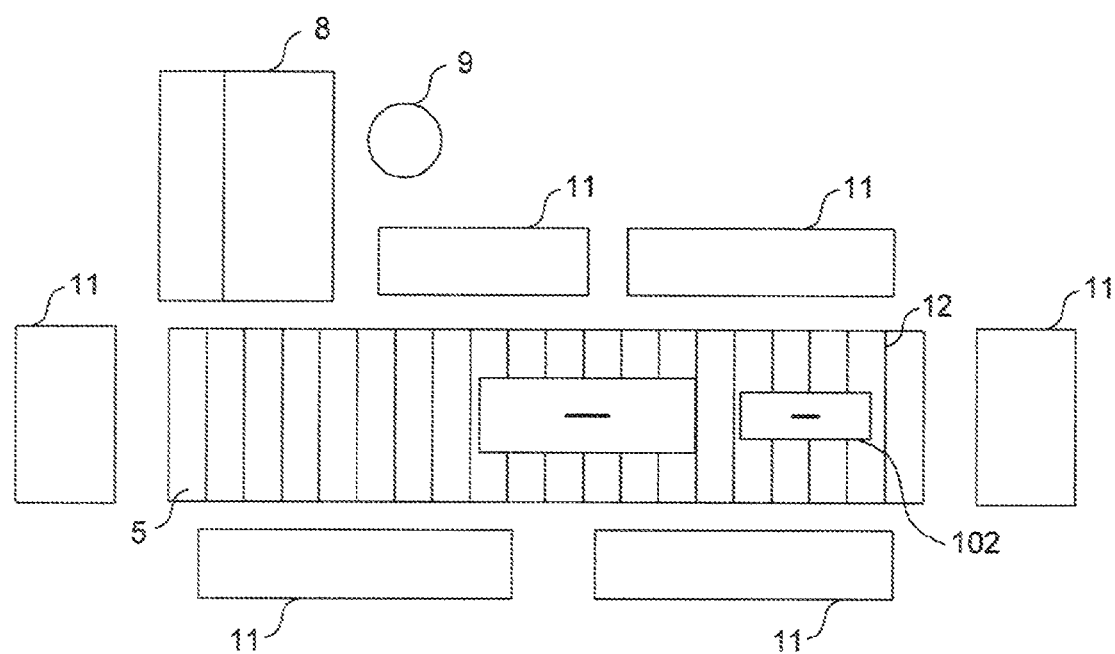
FIG. 4 is a top view of the check-in system of the present invention.

The conveyor belt 2 is at least partly surrounded by access panels, as seen in FIG. 4. The access panels of the check-in system 1 are adjacent to the conveyor belt 2, and may be lifted to allow maintenance or access to the whole of the conveyor belt 2. The access panels are flush with the top surface 5 of the conveyor belt, and with the surrounding floor 3. If an access panel is located adjacent the front end 6 of the conveyor belt 2, a passenger 10 may slide a suitcase 102 from the access panel on to the conveyor belt 2 without lifting the suitcase 102, The check-in system 1 may further comprise a desk 8 and stool 9. The desk 8 and stool 9 may be used by a member of staff operating the check-in system.

Figure 3:
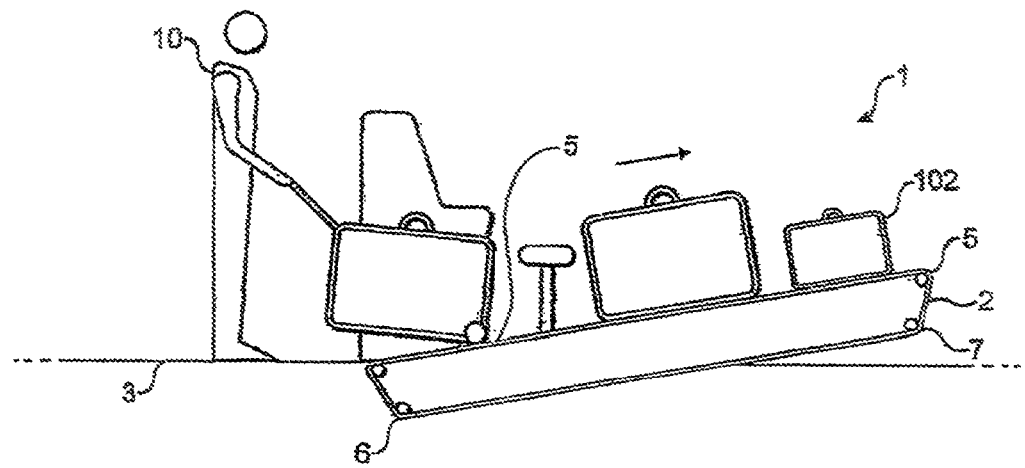
FIG. 3 is a side elevation view of an alternative check-in system of the present invention.

In an alternate embodiment, as shown in FIG. 3, the conveyor belt 2 is inclined upwardly. A front end 6 of the conveyor belt, is recessed in the ground. The top surface 5 of the conveyor belt 2 at the front end 6 is thus level with the adjacent floor 3.

A rear end 7 of the conveyor belt 2 is raised above the level of the surrounding floor 3. A second conveyor belt (not shown) may be located under the rear end 7. This allows a suitcase 102 travelling along the conveyor belt 2 to drop on to the next conveyor belt, which can then continue transporting the suitcase 102. The second conveyor belt may be a conventional conveyor belt, fully or partly located above floor level.

The conveyor belt 2 of any embodiment may be provided with ridges or teeth 12 extending along the width of the conveyor belt. The ridges or teeth 12 may extend over the whole width of the conveyor belt 2, or only over part of the width. The ridges or teeth help prevent a suitcase 102 from slipping on the conveyor belt 2. This is of particular importance in the inclined conveyor belt, to prevent the suitcase 102 from sliding down the conveyor belt 2.

In use, a passenger 10 stands on floor 3 in order to undergo a check-in procedure with a member of staff. A suitcase or any article to be stored in the hold of an aircraft is slid or placed by a passenger 10 on to the front end 6 of the conveyor belt 2. A member of staff operating the check-in system 1 may attach a label to the suitcase 102 at this stage. The member of staff activates the conveyor belt 2 once the suitcase 102 is ready to be transported to the aircraft.

The suitcase 102 is carried by the conveyor belt 2 away from the passenger 10, from the front end 6 to the rear end 7. When the suitcase 102 reaches the rear end of the conveyor belt 2, the suitcase 102 transfers on to another conveyor belt or another handling means, and transported to the aircraft.

The check-in system 1 thus improves the ease of loading of luggage onto the conveyor belt 2, particularly at an airport check-in area. This is particularly of use when the luggage is heavy, or the person checking in has difficulty in lifting their luggage.

The check-in system described may be used outside of an airport, for example the check-in system may be used for loading baggage onto trains or coaches. In this case, the system may not be associated with a check-in desk, but may simply be a conveyor belt in which the top surface of the front end of the conveyor is substantially flush with the surrounding floor.

The invention claimed is:

1. A check-in system for receiving and transporting luggage from a passenger, comprising:
   a conveyor for transporting luggage, the conveyor having a top surface on which luggage is received and which extends from a front end to a rear end;
   a floor adjacent the front end of the conveyor for supporting a passenger, the floor having a recess;
   wherein the front end of the conveyor is located in the floor recess so that the top surface of the front end of the conveyor is substantially flush with the floor so that luggage may be slid from the floor onto the front end of the conveyor.

2. The check-in system of claim 1 wherein the top surface of the conveyor extends horizontally.

3. The check-in system of claim 1 wherein the top surface of the conveyor is inclined upwardly from the lower front end to the higher rear end.

4. The check-in system of claim 1 comprising one or more removable access panels located adjacent to the conveyor and located flush with the floor.

5. The check-in system of claim 4 wherein a portion of the floor adjacent the front end of the conveyor is an access panel.

6. The check-in system of claim 1 wherein the conveyor is provided with ridges on the top surface for preventing slipping of luggage.

7. A system for receiving and transporting luggage from a passenger at a transport hub, comprising:
   a conveyor for transporting luggage, the conveyor having a top surface on which luggage is received, and which extends from a front end to a rear end;
   a floor adjacent the front end of the conveyor for supporting a passenger, the floor having a recess;
   wherein the front end of the conveyor is located in the recess so that the top surface of the front end of the conveyor is substantially flush with the floor so that luggage may be slid from the floor onto the front end of the conveyor.

8. A method of assembling a check-in system, comprising:
   providing a conveyor for transporting luggage having a top surface on which luggage is received and which extends from a front end to a rear end;
   forming a recess in a floor;
   fitting the conveyor in the recess in the floor such that the top surface of the front end is flush with the floor so that luggage may be slid from the floor onto the front end of the conveyor.

\* \* \* \* \*